UNITED STATES PATENT OFFICE.

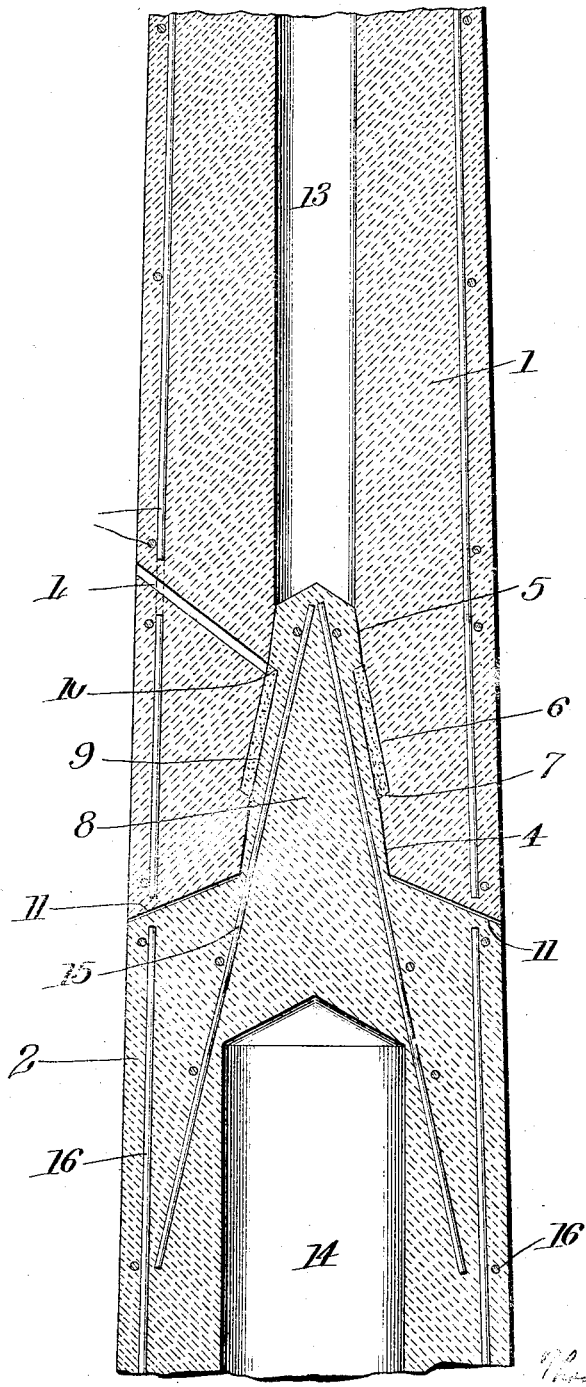

THOMAS I. WESTON, OF COLUMBIA, SOUTH CAROLINA.

JOINT FOR SECTIONAL COLUMNS.

1,196,057.  Specification of Letters Patent.  Patented Aug. 29, 1916.

Application filed February 4, 1915. Serial No. 6,175.

*To all whom it may concern:*

Be it known that I, THOMAS I. WESTON, a citizen of the United States, and resident of Columbia, county of Richland, State of South Carolina, have invented certain new and useful Improvements in Joints for Sectional Columns, of which the following is a specification.

This invention has reference to an improved joint for holding together two parts of a structure such as the parts of a column or pillar made in sections. In the drawing it has been shown applied to the making of reinforced concrete columns or pillars such as are used to support telegraph wires, but it will of course be understood that the invention is not limited to that use. It is useful in making any column whether hollow or solid.

It has been, my purpose to so make the joints that the parts can be easily and cheaply made and can be easily assembled and so that when assembled the structure will be very rigid and strong.

The novel features of the invention will be apparent from the following description, taken in connection with the accompanying drawing.

In the drawing I have shown a sectional view of a part of a reinforced concrete column embodying my invention.

As shown in the drawing the column is made up of separable sections 1 and 2 which are put together end to end. The section 1 may be made of concrete having the reinforcing material 3 embedded therein and that section has a tapering socket 4 in its center at the lower end. The socket preferably tapers uniformly from its lower end to its upper end 5 except for a depression at one point between the ends to form a key. The depression commences some distance below the upper end 5 and extends gradually outward on the line 6, the lower end of the depression forming a shoulder 7 facing toward the smaller inner end of the socket.

The lower member 2 of the column has a central projection 8 which is tapered to correspond to the taper of the socket 4. This projection also has depressions on its surface corresponding to the depressions in the socket, the surface 9 of the depression commencing some distance above the lower end of the projection and extending gradually inward to a point some distance below the top or upper end of the projection, there forming the shoulder 10. The meeting faces of the members 1 and 2 outside of the projection and socket are preferably formed on a slight downwardly extending angle on the line 11, and the projection and socket have such relative size that the socket will come in contact with the projection throughout the tapered surface, slightly before the lower end of the member 1 comes in contact with the upper end of the member on the line 11. This insures a close and tight fit when the upper member 1 is placed in position, since it will make close contact with the projection because of its weight. A passageway 12 may be provided through the upper member to the space or keyway formed by the depressions on the lines 6 and 9 so that a cement or filling material may be inserted into the keyway after the parts are assembled. When this filling material hardens in place it will, because of the shoulders 7 and 10, act as a key preventing the separation of the parts. Some cement may also be placed on top of the member 2 along the lines 11 so as to fill the space when the parts are in position. The upper member may be made with a hollow center 13 and the lower member may also be made hollow at 14, and in that case the central projection 8 may be made solid connected with the outer walls of the hollow section and the reinforcing material 15 may be extended from the body of the material in the hollow section on an incline up into the projection and will preferably be extended practically to the point in concrete construction. Additional reinforcing material 16 may be placed along the outer part of the body.

It will be observed that the tapering walls of the socket and projection tend to easily and properly center the parts and the gradual taper of the walls 6 and 9 tends to guide the projection into position, since the wall 6 on the socket tapers toward the point of the socket and the wall 9 of the projection tapers toward the base of the projection. It will be noted that the bearing surface between the projection and the socket extends throughout to materially the length of the socket both at the top and at the bottom so as to furnish a firm support.

Having thus described the invention what is claimed is,

1. A column construction, comprising a pair of members, one of which has a central tapering socket and the other of which has a central tapering projection, the said projection fitting closely in said socket throughout an extended portion longitudinally of said projection at both ends, the relative sizes of the socket and projection being such that the parts will fit together tightly just before the outer end of the socket reaches the inner end of the projection, the projection and socket being provided with a keyway between the ends of said projection, and means for supplying a filling material to said keyway to lock the parts together.

2. A reinforced concrete construction comprising a pair of members, one of which is provided with a central tapering socket and the other of which is provided with a central tapering projection fitting in said socket, reinforcing means in the body of one member around said socket and reinforcing means in the body of the other member extending up into said projection, and a filling material between said socket and projection securing the parts together.

3. A column construction, comprising a pair of members one of which has a central tapering socket and the other of which has a central tapering projection, the said projection fitting closely in said socket throughout an extended portion longitudinally of said projection at both ends, the relative sizes of the socket and projection being such that the parts will fit together tightly just before the outer end of the socket reaches the inner end of the projection, the projection and socket being provided with a keyway between the ends of said projection, the wall of the keyway in the projection tapering gradually inward toward the small inner end of the projection, and the wall of the keyway in the socket tapering gradually toward the inner end of the socket, whereby the parts will be properly centered when pushed together, and means for supplying a filling material to said keyway.

In testimony whereof I affix my signature in presence of two witnesses.

THOMAS I. WESTON.

Witnesses:
LAURA TUCKER,
N. I. DORMAN.